126,894

UNITED STATES PATENT OFFICE.

GEORGE R. MENEELY, OF WEST TROY, NEW YORK.

IMPROVEMENT IN PROCESSES OF WELDING BRASS OR ALLOY OF COPPER TO IRON OR STEEL.

Specification forming part of Letters Patent No. 126,894, dated May 21, 1872.

*To all whom it may concern:*

Be it known that I, GEORGE R. MENEELY, of West Troy, in the county of Albany and State of New York, have invented a new and improved process for uniting or molding brass, bronze, or other alloys of copper with cast or wrought iron or steel; and I do hereby declare the following to be a full, clear, and exact description of said process.

I am aware that heretofore pieces of iron, steel, &c., have been united by the interposition of brass or other copper alloy; but it has been accomplished by highly heating the iron to which it was desired to weld the brass, bronze, &c. This process, in actual practice, is attended with much inconvenience; and it is the design of my invention to obviate this difficulty and provide a ready and practical process by which the same object may be accomplished, and at the same time a much better weld obtained.

To enable others skilled in the art to which my invention relates to make and use the same, I will here proceed to describe the process and operation of the same, which is as follows, to wit:

The surface of iron or steel to which it is desired to weld the brass, bronze, or gun metal is prepared by simply thoroughly cleansing the same on a grindstone or otherwise. It is then placed in a proper mold or flask. The brass or bronze is then, after being heated to a high temperature, known as "milk-white," poured into the flask and upon the surface of the iron or steel to which it is desired to weld the brass or bronze. A much larger quantity of this heated brass or bronze is poured over the surface of the iron or steel than is required to fill the mold. This continued pouring heats the surface of the iron, renders it more porous, and allows the particles of the iron and bronze to become firmly and permanently united.

The surplus quantity of brass, bronze, or other copper alloy is allowed to escape from the flask or mold through proper sprues constructed for that purpose. The proper quantity of heated bronze metal to be poured over the iron or steel surface will, of course depend in a great degree upon the area of the surface to which it is desired to weld the bronze or other copper alloy. In practice I have found that about three times the quantity necessary to fill the mold is preferable. I don't wish to confine myself to any definite proportion; but the quantity thus poured or flowed over the surface of the iron or steel should be sufficient to thoroughly heat and soften said surface, so that when the desired quantity of molten bronze or other copper alloy is left upon said iron or steel surface the particles of the iron and bronze will intermingle and unite, and after becoming cool will be firmly united and welded together. By this process it is unnecessary to heat the iron or steel before placing it in the flask or mold, as the continued pouring of the highly-heated copper alloy over the surface of the iron or steel to which it is desired to weld the alloy accomplishes the same purpose with greater certainty, and results in a much better and firmer weld.

What I claim as my invention, and desire to secure by Letters Patent of the United States, is—

The process, substantially as described, of uniting or welding brass, bronze, gun-metal, or other alloy of copper to the surface of iron or steel.

In witness whereof I have hereunto set my hand this 22d day of January, 1872.

GEO. R. MENEELY.

Witnesses:
T. W. GETMAN,
C. D. KELLUM.